United States Patent
Hasegawa et al.

(10) Patent No.: US 8,582,335 B2
(45) Date of Patent: Nov. 12, 2013

(54) INVERTER APPARATUS

(75) Inventors: Ryuta Hasegawa, Hino (JP); Hiroshi Mochikawa, Hachioji (JP); Masami Hirata, Yokkaichi (JP); Yukihiko Hatano, Ichinomiya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/461,201

(22) Filed: May 1, 2012

(65) Prior Publication Data
US 2012/0217795 A1 Aug. 30, 2012

Related U.S. Application Data

(63) Continuation of application No. PCT/JP2010/069035, filed on Oct. 27, 2010.

(30) Foreign Application Priority Data

Nov. 2, 2009 (JP) .................................. 2009-252332

(51) Int. Cl.
*H02M 7/5387* (2007.01)

(52) U.S. Cl.
USPC ........................................................ 363/132

(58) Field of Classification Search
USPC ........................................................ 363/132
See application file for complete search history.

(56) References Cited

U.S. PATENT DOCUMENTS

| | | | |
|---|---|---|---|
| 2003/0169611 A1* | 9/2003 | Nishizawa et al. | 363/132 |
| 2006/0114702 A1* | 6/2006 | Yamada et al. | 363/132 |
| 2009/0108794 A1* | 4/2009 | Ochiai et al. | 363/132 |
| 2010/0080024 A1* | 4/2010 | Wei et al. | 363/74 |

FOREIGN PATENT DOCUMENTS

| | | | |
|---|---|---|---|
| JP | 07234162 A | * | 9/1995 |
| JP | 2007-195343 A | | 8/2007 |
| JP | 2009-171702 A | | 7/2009 |
| JP | 2009-229128 A | | 10/2009 |
| JP | 2009-232656 A | | 10/2009 |

OTHER PUBLICATIONS

International Search Report dated Feb. 1, 2011 (in English) in counterpart International Application No. PCT/JP2010/069035.
International Preliminary Report on Patentability (IPRP) dated Jun. 21, 2012 (in English) issued in counterpart International Application No. PCT/JP2010/069035.

* cited by examiner

*Primary Examiner* — Jue Zhang
(74) *Attorney, Agent, or Firm* — Holtz, Holtz, Goodman & Chick, PC

(57) ABSTRACT

An inverter apparatus according to one embodiment includes switching elements and freewheel diodes which are connected to a direct-current power supply, a temperature detector provided near at least one of the switching elements, and a temperature estimation unit. The temperature estimation unit estimates temperatures of switching elements not provided with the temperature detector, based on an estimated-temperature increase value calculated by a loss model of the switching elements and freewheel diode and others, and a temperature of the switching element detected by the temperature detector.

7 Claims, 5 Drawing Sheets

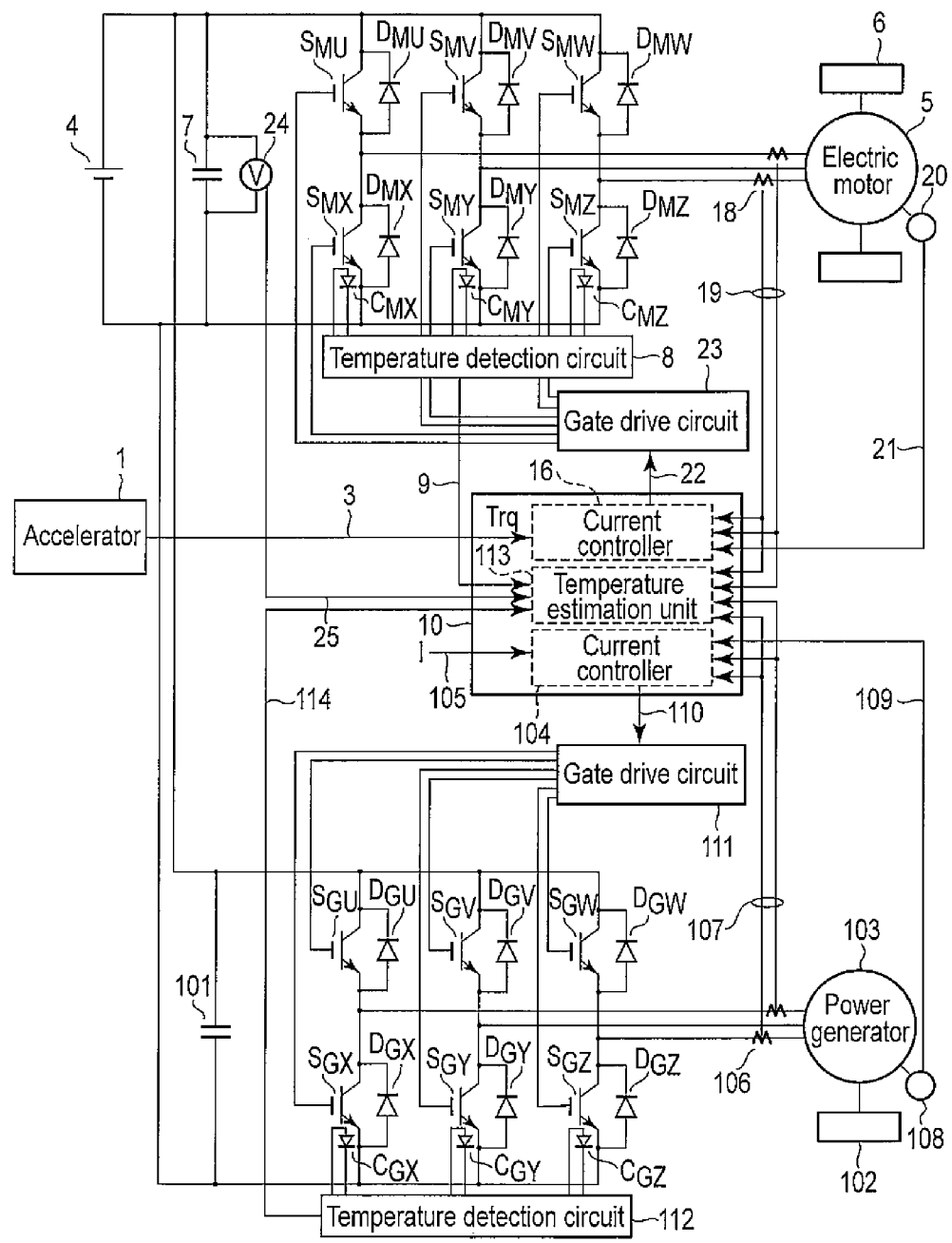
F I G. 6

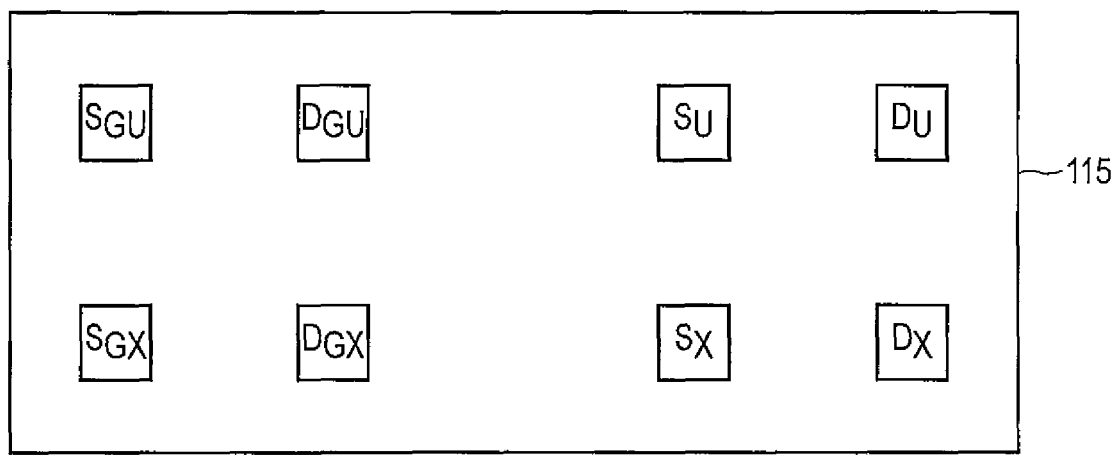
F I G. 7

US 8,582,335 B2

INVERTER APPARATUS

CROSS-REFERENCE TO RELATED APPLICATIONS

This application is a Continuation Application of PCT Application No. PCT/JP2010/069035, filed Oct. 27, 2010 and based upon and claiming the benefit of priority from prior Japanese Patent Application No. 2009-252332, filed Nov. 2, 2009, the entire contents of all of which are incorporated herein by reference.

FIELD

Embodiments described herein relate generally to an inverter apparatus which drives an electric motor, and particularly to a technology for estimating a temperature of a switching element forming part of an inverter.

BACKGROUND

An electric motor is used in a hybrid car in combination with an engine or in an electric car which is driven only by an electric motor. When the electric motor is driven, an inverter is used to obtain desired torque and frequency. The inverter is built in a car and is demanded to achieve high power at high integration density to ensure a passenger space.

Depending on driving environments of a car, an operation temperature of the inverter greatly changes. Particularly in a hybrid car, the inverter has a high temperature under influence of heat generation of an engine. Switching elements in the inverter have a risk that the temperature increases under influence of constant loss due to a current through the switching elements themselves and switching loss due to switching on/off, in addition to influence of such an environmental temperature, and a breakdown may occur when a certain temperature is exceeded.

To avoid breakdown of the switching elements, the temperatures of the switching elements need to be detected for protection. Since temperature detection can be performed with high accuracy by using an on-chip sensor in which a diode is assembled in an element, such a sensor is mounted on an inverter for a hybrid car. Since the on-chip sensor has a high electric potential, temperature information needs to be transferred to a micro-controller (hereinafter abbreviated as mi-con) through an insulating circuit. In an inverter on which at least six switching elements are mounted, a plurality of insulating circuits are required to detect temperatures of all the switching elements. A board area increases and may cause an inverter capacity to increase.

To solve problems as described above, a method can be considered in which temperature detection is performed only partially on several of the switching elements and temperatures of the other switching elements are estimated. There has been disclosed a method in which one or more switching element temperatures are detected and a temperature of a switching element having a maximum temperature is estimated from thermal transfer models of IGBT modules.

According to a conventional method, loss models of switching elements and thermal transfer models belong to a steady state. In transition to a state in which a current concentrates only on a part of the switching elements, e.g., when a motor is locked or rotates at a low frequency, a switching element which has a maximum temperature can not steadily be specified, and switching element temperatures can not accurately be estimated, either. In addition, thermal transfer models are constructed on the basis of estimated temperature values of switching elements existing around a switching element which is estimated to have the maximum temperature. Therefore, when a basing switching element temperature includes an error, an estimation error concerning the switching element temperature indicating the maximum temperature increases.

The embodiments have been made to solve problems as described above, and have an object of reducing the number of components forming an inverter apparatus and reducing a board space by accurately estimating temperatures of the other switching elements, based on a temperature detected from one switching element, whatever state an operation mode of the inverter is in.

BRIEF DESCRIPTION OF THE DRAWINGS

FIG. 6 is a diagram showing an inverter circuit and a control block according to the embodiment 3.

FIG. 7 is a semiconductor module according to the embodiment 3.

DETAILED DESCRIPTION

Various embodiments will be described hereinafter. In general, according to one embodiment, there is provided an inverter apparatus comprising: a direct-current power supply 4; switching elements S and freewheel diodes D which are connected to the direct-current power supply; an unit which converts a direct current voltage into a predetermined alternating current voltage of a predetermined current and a predetermined frequency, depending on switching on/off of the switching elements; a temperature detector C provided near at least one of the switching elements and a temperature estimation unit 17, wherein the temperature estimation unit 17 estimates temperatures of freewheel diodes D and switching elements S not provided with the temperature detector C, based on a loss model (Expression 1-6) of the switching elements S and freewheel diodes D, a thermal resistance model (Expression 7-9) of a module which fixes the switching elements and freewheel diodes, an estimated-temperature increase value calculated by the loss model and thermal resistance model, and a temperature of the switching element detected by the temperature detector.

Hereinafter, embodiments of an inverter apparatus will be described with reference to the drawings.

Embodiment 1

Configuration

Figure 1:
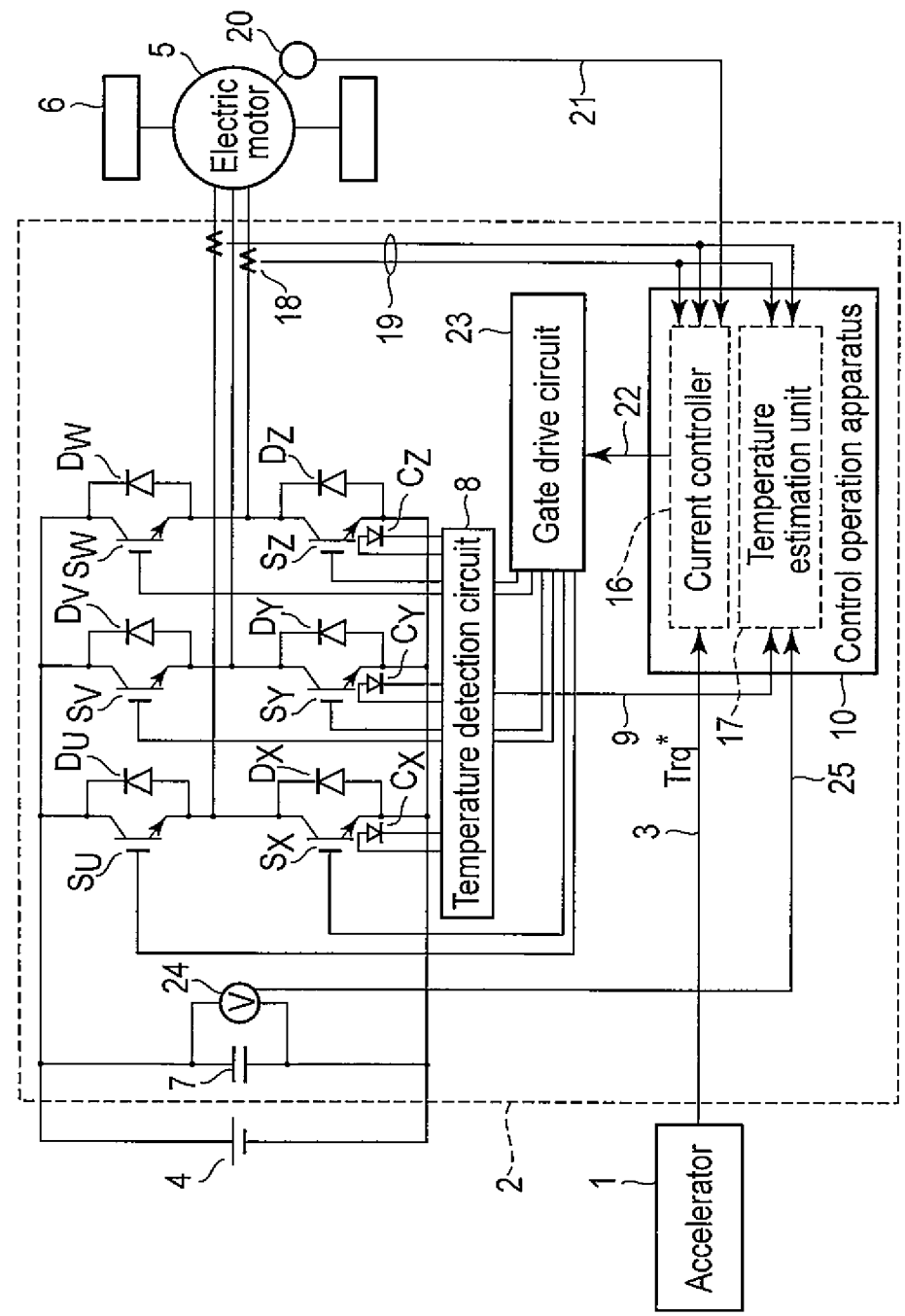
FIG. 1 is a diagram showing an inverter circuit and a control block according to an embodiment 1.

FIG. 1 shows a configuration of an embodiment when an inverter apparatus according to one embodiment is applied to an electric vehicle such as an electric car or a hybrid car. The inverter apparatus according to the embodiment can be applied not only to an electric vehicle but also to an electric propulsion ship.

The inverter apparatus inputs a torque command value Trq* to an inverter 2 from an accelerator 1, and converts an output voltage of a direct current voltage source 4 such as a battery into a three-phase alternating-current voltage having a variable voltage and a variable frequency, depending on the torque command value Trq*, thereby to control wheels 6 by driving an electric motor 5.

In the inverter 2, a condenser 7 which smoothes a direct current voltage is connected to an input stage, and bridged circuits of a U-phase, a V-phase, and a W-phase are formed by switching elements. In the bridge circuit of the U—phase, a connection point between a switching element $S_U$ and a switching element $S_X$ is connected to an electric motor 5. The switching elements $S_U$ and $S_X$ are respectively connected in anti-parallel with return diodes $D_U$ and $D_X$.

The bridge circuit of the V-phase, which is formed by the switching elements $S_V$ and $S_Y$ and the return diodes $D_V$ and $D_Y$, as well as the bridge circuit of the W-phase, which is formed by the switching elements $S_W$ and $S_Z$ and the return diodes $D_W$ and $D_Z$, is formed in the same configuration as described above.

A temperature sensor is provided near one or a plurality of the switching elements $S_U$, $S_X$, $S_V$, $S_Y$, $S_W$, and $S_Z$. In the present embodiment, temperature sensors $C_X$, $C_Y$, and $C_Z$ are respectively provided as low-side elements of the switching elements $S_X$, $S_Y$, and $S_Z$. The temperature sensors $C_X$, $C_Y$, and $C_Z$ are on-chip diodes built on the switching elements. Under condition of a constant current, diodes have a tendency that a forward voltage decreases as a temperature increases. A temperature of a switching element is obtained by supplying a constant current for a diode and by measuring a forward voltage. Temperature sensors of a type other than diodes are applicable as the temperature sensors although the sensor desirably has high responsibility and accuracy.

Voltages which are output from the temperature sensors $C_X$, $C_Y$, and $C_Z$ are input to a temperature detection circuit 8.

Figure 2:
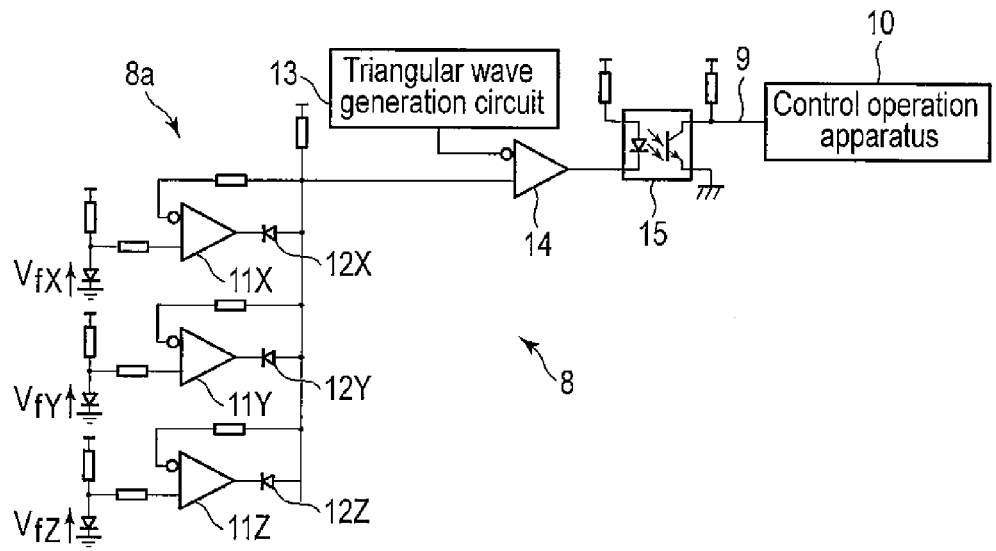
FIG. 2 is a diagram showing a temperature detection circuit according to the embodiment 1.

A temperature signal 9 of a switching element which indicates the highest temperature among the switching elements is transmitted to a control calculation apparatus 10. The switching elements $S_X$, $S_Y$, and $S_Z$ which form a lower leg (also referred to as an arm) of the inverter have equal potentials and need not be isolated from each other. Therefore, a temperature signal indicating a maximum temperature $T_{NMAX}$ can be easily extracted. FIG. 2 shows an example of a circuit 8a to select the maximum temperature $T_{NMAX}$. The present circuit is generally used as a minimum value circuit formed of operation amplifiers 11X, 11Y, and 11Z and diodes 12X, 12Y, and 12Z, and the lowest voltage among temperature sensor voltages $V_{fX}$, $V_{fY}$, and $V_{fZ}$. Circle marks marked at operation amplifier inputs respectively represent inverted input terminals. A forward voltage of a diode decreases as a temperature thereof increases. Therefore, the lowest voltage is a signal which indicates the maximum temperature $T_{NMAX}$.

Output voltages are compared with an output of a triangular wave generation circuit 13 by a comparator 14, and are converted into pulses which are transferred to a control operation apparatus 10 through an insulating element 15 such as a photocoupler. The maximum temperature $T_{NMAX}$ is obtained by calculating a duty ratio of pulses with a control operation apparatus 10. FIG. 2 shows a circuit which is configured such that a duty decreases as a temperature increases. If one signal is thus transferred, one insulating element is enough for use in the temperature detection circuit 8, and a circuit scale need not be enlarged. Although one of temperatures of the switching elements $S_X$, $S_Y$, and $S_Z$ may be constantly detected, a more highly reliable temperature protection system can be provided by detecting the maximum temperature.

The control operation apparatus 10 is formed of a current controller 16 and a temperature estimator 17. The current controller 16 is input with an instantaneous three-phase-current value 19 obtained from a current detector 18 and an electric angle 21 obtained from an angle detector 20 of an electric motor. A current command value corresponding to the torque command value Trq* is calculated by the current controller 16, and a gate signal 22 with which a desired current can be obtained is output to a gate drive circuit 23. The gate drive circuit 23 is connected to all the gates that the switching elements $S_U$, $S_V$, $S_Y$, $S_W$, and $S_Z$ have, and switches on/off them, in accordance with the gate signal 22 input from the control operation apparatus 10.

The temperature estimator 17 is input with the instantaneous three-phase-current voltage 19, a voltage value 25 obtained from the direct current voltage detector 24, and a maximum switching-element temperature 9 among switching element temperatures obtained from the temperature sensors $C_X$, $C_Y$, and $C_Z$. Based on these physical amounts, temperatures of all the switching elements and return diodes are estimated.

A whole configuration of the inverter apparatus has been described above.

(Operation)

Figure 3:
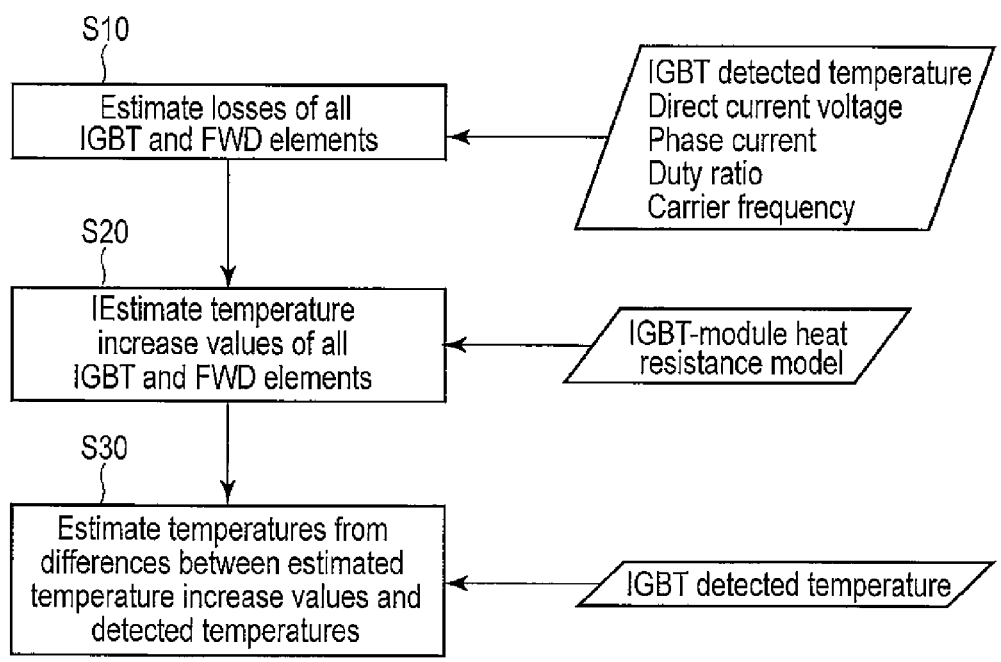
FIG. 3 is a flowchart showing an outline of a temperature estimation method which is carried out by a temperature estimation unit 17.

FIG. 3 is a flowchart showing an outline of a temperature estimation method which is carried out by the temperature estimator 17. At first, the temperature estimator 17 estimates losses of all the elements of the IGBT and return diodes (FWD), based on IGBT temperatures, direct current voltages, phase currents, duty ratios, and carrier frequencies (S10). Next, the temperature estimator 17 estimates temperature increase values of all the elements of IGBT and FWD elements, by inputting the losses to an IGBT-module heat-resistance model (S20). Further, the temperature estimator 17 calculates temperatures from differences between the temperature increase estimation values and detected temperatures (S30). Using a detected temperature of an IGBT as a base, temperatures of other elements whose temperatures have not yet been detected are calculated.

An estimation method for estimating temperatures of switching elements and return diodes in the first embodiment will be described in details below. The temperature of each element depends on heat generated by a loss of the element itself and heat caused by losses of peripheral elements. Therefore, loss of each element needs to be estimated at first.

At first, an estimation method for estimating losses of the switching elements $S_U$ to $S_Z$ will be described in details. Losses of the switching elements can be classified into conduction losses and switching losses. At first, a conduction loss is caused by a current flowing through an element and a resistance component of the element itself, and depends on a junction temperature. Therefore, the conduction loss is expressed by Expression 1, below.

$$P_{sat}=f(I_C,T_j)\times DUTY \quad (1)$$

Here, $I_C$=current flowing through an element (instant value), $T_j$=junction temperature of an element, and DUTY=conduction rate of a switching element are given. The current $I_C$ can be obtained from a current detector 18. $T_j$ is a temperature to estimate from now and can therefore not be obtained. However, in the present embodiment, the maximum temperature $T_{NMAX}$ of an element in a low side, which has been detected by a temperature sensor, is applied to all the elements. In the present embodiment, estimation is carried out not based on an average temperature but based on the maximum temperature for expectation of safety. A function f is expressed as a polynomial using a current $I_C$ and a temperature $T_j$, and is prestored in a control operation apparatus 10. Where the leg of U-phase is taken as an example, the current flows through the switching element $S_U$ or the freewheel diode $D_X$ if a U-phase current $I_U$ is a positive value. If the U-phase current $I_U$ is a positive value, the current flows through the switching element $S_X$ or the freewheel diode $D_U$. Therefore, when the current $I_U$ is positive, $I_C=I_U$ is substituted in Expression 1, to obtain a conduction loss of the switching element $S_U$. Since the switching element $S_U$ switches on/off, an average conduction loss for a switching cycle $T_{SW}$ is obtained by multiplying a conduction rate $DUTY_U$ indicating a ratio of an on-cycle. At this time, no current flows through the switching element $S_X$, and therefore, the conduction loss of the element $S_X$ is zero. Conversely, when the current $I_U$ is negative, a current flows through the switching element $S_X$. $I_C=-I_U$ is substituted in Expression 1, and a conduction rate $DUTY_X$ is subjected to multiplication. Accordingly, a conduction loss thereof can be obtained. Of course, the switching loss of the switching element $S_U$ is zero at this time. Conduction losses of the respective switching elements of V- and W-phases can be calculated in a similar manner. The switching cycle $T_{SW}$ is sufficiently short in comparison with a time constant of temperature increase. Therefore, the loss obtained by Expression 1 can be dealt with as an instantaneous value without problems.

In contrast, a switching loss is a sum of an on-loss PSWON caused at the time of turn-on and an off-loss PSWOFF caused at the time of turn-off. Overlapping of a voltage and a current, i.e., simultaneous generation of a voltage and a current in a switching element causes a loss. These losses depend on the junction temperature $T_j$, and are therefore expressed by Expressions 2 and 3, respectively.

$$P_{SWON}=g(I_C,V_{DC},T_j)\times f_{SW} \quad (2)$$

$$P_{SWOFF}=h(I_C,V_{DC},T_j)\times f_{SW} \quad (3)$$

Here, $V_{DC}$=direct current voltage and $f_{SW}$=switching frequency are given. The voltage $V_{DC}$ is obtained from the voltage detector 24. These functions g and h can be described as polynomials of parameters, and are stored in the control operation apparatus 10. Like conduction losses, switching losses are not caused unless a current flows through an element. The U-phase leg is exemplified again. When the current $I_U$ is positive, a current flows through the switching element $S_U$. Therefore, a switching loss of the switching element $S_U$ is obtained by substituting $I_C=I_U$ in Expressions 2 and 3. Since no current flows through the switching element $S_X$, the switching loss of the element $S_X$ is zero. When the current $I_U$ is negative, $I_C=-I_U$ is substituted in Expressions 2 and 3, and a switching loss of the switching $S_X$ is obtained. The switching loss of the switching element $S_U$ is zero at this time. Switching losses of the switching elements having the V- and W-phases are calculated in a similar manner.

A conduction loss and a switching loss are obtained from each of the switching elements $S_U$ to $S_Z$. A sum of the conduction loss and the switching loss is a loss caused by one element.

Next, an estimation method for estimating a loss generated from a freewheel diode will be described. For a switching element and a freewheel diode connected to each other, a freewheel diode is provided in order to prevent a surge voltage to be generated when the switching element turns off. Therefore, a current flows through the freewheel diode during an off-period of the switching element. During an on-period of the switching element, no current flows through the freewheel diode.

A loss of the freewheel diode is calculated as a sum of a conduction loss and a recovery loss. A basic calculation method for a conduction loss is the same as that for switching elements. That is, the method can be described as Expression 4 with use of a function i expressed by a polynomial of a current and a junction temperature.

$$P_{sat}=i(I_C,T_j)\times(1-DUTY) \quad (4)$$

DUTY is a conduction rate of paired switching elements (for example, the switching element $S_X$ relative to the freewheel diode $D_U$).

A description will be made, exemplifying the U-phase leg. In order to obtain a conduction loss of the freewheel diode $D_X$, $I_C=I_U$ is substituted in Expression 4 when the U-phase current IU is positive. Since the freewheel diode $D_X$ is conducted during a period in which the switching element $S_U$ is off, $1-DUTY_U$ which indicates a ratio of an off-period of the switching element $S_U$ may be multiplied. At this time, no current flows through the freewheel diode $D_U$, and therefore, the conduction loss of the freewheel diode $D_U$ is zero. When the U-phase current IU is negative, $I_C=-I_U$ is substituted in Expression 4, and multiplication with the ratio $1-DUTY_X$ of the switching element $S_X$ is performed, thereby to obtain a conduction loss of the freewheel diode $D_U$. Since the freewheel diode $D_X$ is not conducted, the conduction loss of the freewheel diode $D_X$ is naturally zero.

In contrast, a recovery loss is generated when a freewheel diode transitions to off, and the recovery loss depends on a direct current voltage, a current, and a junction temperature. Therefore, the recovery current can be calculated by Expression 5. Since the freewheel diode requires only a negligibly short time before turning on, a loss at the time of transitioning to on is negligible.

$$P_{rr}=j(I_C,V_{DC},T_j)\times f_{SW} \quad (5)$$

A function j is a polynomial formed of three parameters. Unless a current flows through a freewheel diode, no switching loss is caused. A detailed description will now be made, exemplifying the U-phase leg. When the current $I_U$ is positive, a current flows through the freewheel diode $D_X$. Therefore, a recovery loss of the freewheel diode $D_X$ is obtained by substituting $I_C=I_U$ in Expression 5. At this time, no current flows through the freewheel diode $D_U$, and therefore, the recovery loss of the freewheel diode $D_U$ is zero. When the current IU is negative, $I_C=-I_U$ is substituted in Expression 5, and a recovery loss of the freewheel diode $D_U$ is obtained. At this time, the recovery loss of the freewheel diode $D_X$ is zero. Recovery losses of return diodes of the V- and W-phase are calculated in a similar manner.

A conduction loss and a recovery loss are obtained for each of return diodes $D_U$ to $D_Z$. A total of the conduction loss and the recovery loss is a loss caused by one freewheel diode.

By performing calculations described above, losses caused by all the switching elements and return diodes are obtained.

When the electric motor is driven at a low frequency, the loss estimation method as described above is available. However, when the electric motor is driven at a high frequency, a calculation time required for estimating losses and temperatures is not sufficiently short, in comparison with the drive frequency. For example, when a cycle of a drive signal frequency is equal to the calculation time, equal detection current values are used for each calculation cycle. Therefore, accuracy of loss estimation remarkably deteriorates.

Hence, when the electric motor is driven at a high frequency, an effective current value $I_{rms}$ is used for loss estimation. At this time, the conduction loss is given by Expression 6 below, where M is the modulation rate and $\phi$ is the power factor.

$$P_{sat} = k(I_{rms}, T_j, M, \phi) \tag{6}$$

An on-loss $P_{SWON}$, an off-loss $P_{SWOFF}$, and a recovery loss $P_{trr}$ are obtained by supposing an average current value as $$I_{ave} = \frac{2\sqrt{2} \, I_{rms}}{\pi}$$

by substituting this value for $I_C$ in Expressions 2, 3, and 5, and by further halving.

Switching of the loss calculation method is determined by an electric frequency obtained by an angle detector. When the electric frequency is smaller than a frequency $f_e$, an instantaneous current value is used for loss estimation, and when the electric frequency is equal to or grater than a frequency $f_e$, an effective current value $I_{rms}$ is used for loss estimation. The cycle of the frequency $f_e$ is sufficiently shorter than a calculation cycle and a heat/time constant of the switching elements.

Next, a process for obtaining a temperature increase value will be described with use of a calculated loss. The relationship of Expression 7 exists between a loss $P_{FLOSS}$ and a temperature increase value $\Delta T_j$. The temperature increase $\Delta T_j$ is the difference between a junction temperature and a peripheral temperature.

$$\Delta T_j = P_{LOSS} \times Z_{th} \tag{7}$$

$P_{LOSS}$ is a loss of a target for which the temperature increase $\Delta T_j$ is calculated. However, modules are formed to be adjacent to other semiconductor elements in many cases, and are therefore influenced by losses generated from the other semiconductor elements. Accordingly, the temperature increases. That is, highly accurate temperature estimation requires obtaining a temperature increase to be obtained by considering the influence of the other semiconductor elements. $Z_{th}$ is called the thermal transfer impedance, and is determined by the shape and a material of a module formed by switching elements and return diodes. That is, the thermal transfer impedance $Z_{th}$ is obtained by a simulation or an experiment. $Z_{th}$ is expressed in form of Expression 8, below.

$$Z_{th} = \sum_{k=1}^{n} \left[ R_{thk} \left\{ 1 - \exp\left(-\frac{t}{\tau_k}\right) \right\} \right] \tag{8}$$

$R_{th}$ is called the thermal resistance and is a constant expressing the relationship between a loss and a temperature increase in a steady state. $\tau$ is a heat/time constant indicating the ratio of temperature increase to elapsed time in a transition state. These values and the magnitude of a natural number n are determined by the shape and the material of a module. Here, $Z_{th}$ can be expressed as a parallel circuit of the thermal resistance $R_{th}$ of a material, to which heat is transferred, and the heat/time constant $\tau$. For example, when heat is transferred through silicon and copper, $Z_{th}$ is a series circuit of the thermal impedance of silicon and the thermal impedance of copper (n=2).

Figure 4:
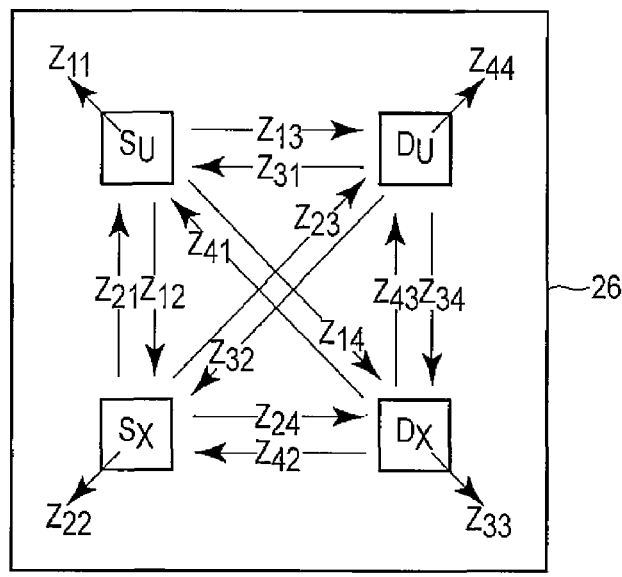
FIG. 4 is a diagram showing a semiconductor module according to the embodiment 1.

An example configuration of a semiconductor module is shown in FIG. 4, and an estimation method for estimating a temperature increase will be described with reference to the figure. A semiconductor element forming a U-phase leg is mounted as an example on a semiconductor module 26 in FIG. 4, which shows the relationship between each semiconductor element and a thermal transfer impedance. At this time, Expression 9 is satisfied, provided that switching elements $S_U$ and $S_X$ and return diodes $D_U$ and $D_X$ are respectively set as $\Delta T_{SU}$, $\Delta T_{SX}$, $\Delta T_{DU}$, and $\Delta T_{DX}$. Thermal transfer impedances $Z_{ij}$ all comply with the form of Expression 8, and values of the thermal resistance $R_{th}$, the heat/time constant $\tau$, and the natural number n are determined by a shape and a material of the module 26 and by positions where semiconductor elements are provided. These $Z_{ij}$ are prestored in the control operation apparatus 10.

$$\begin{bmatrix} \Delta T_{SU} \\ \Delta T_{SX} \\ \Delta T_{DU} \\ \Delta T_{DX} \end{bmatrix} = \begin{bmatrix} Z_{11} & Z_{21} & Z_{31} & Z_{41} \\ Z_{12} & Z_{22} & Z_{32} & Z_{42} \\ Z_{13} & Z_{23} & Z_{33} & Z_{43} \\ Z_{14} & Z_{24} & Z_{34} & Z_{44} \end{bmatrix} \begin{bmatrix} P_{SU} \\ P_{SX} \\ P_{DU} \\ P_{DX} \end{bmatrix} \tag{9}$$

Temperature increase values of elements respectively forming semiconductor modules of V- and W-phases are obtained by use of Expression 9.

After temperature increase values of all semiconductor elements are thus obtained, an actual junction temperature is estimated. The junction temperature input to the control operation apparatus 10 is a maximum temperature $T_{NMAX}$ of low-side elements. Among the temperature increase values $\Delta T_{SX}$, $\Delta T_{SY}$, and $\Delta T_{SZ}$ which are calculated by Expression 9, the greatest value indicates the maximum temperature increase value $\Delta T_{NMAX}$ of the low-side elements. Provided that an environmental temperature is Ta, Expression 10 is satisfied.

$$T_{NMAX} = T_a + \Delta T_{NMAX} \tag{10}$$

That is, $\Delta T_{NMAX}$ is the greatest value among the temperature increase values $\Delta T_{SX}$, $\Delta T_{SY}$, and $\Delta T_{SZ}$ of respective phases, which are calculated for low-side switching elements of respective phases whose temperatures are measured by use of Expression 9.

For example, when the junction temperature $T_{SU}$ of the switching element $S_U$ is to be estimated, the junction temperature $T_{SU}$ can be calculated by Expression 11, and the environmental temperature $T_a$ need not be detected. This $T_{SU}$ is a temperature estimation value of the switching element $S_U$ at present.

$$T_{SU} = T_a + \Delta T_{SU} = (T_{NMAX} - \Delta T_{NMAX}) + \Delta T_{SU} \tag{11}$$

In a similar manner, temperatures of all the switching elements and return diodes can be estimated.

(Effect)

Conventionally, there has been disclosed a temperature estimation method in case where all semiconductor elements are mounted on one module. Temperature detection is performed on only one switching element, and temperature estimation is performed with a detected temperature thereof used as a reference. Therefore, if different modules are used respectively for U-, V-, and W-phases as in the present embodiment, estimation cannot be performed with modules of the other two phases used as references, in the prior art. In the present embodiment, the maximum temperature $T_{NMAX}$ of the low-side element is detected, and therefore, the maximum temperature $T_{NMAX}$ can be steadily detected at least on the low side.

However, a temperature can be estimated by detecting a junction temperature for any one of all switching elements, in place of taking the maximum temperature $T_{NMAX}$ of the low-side elements as the temperature as a reference. However, reliability improves by using the maximum temperature.

In the prior art, a switching element which takes the maximum temperature is estimated according to information of an electric angle obtained from an angle sensor. As in the present embodiment, a module including return diodes complicates heat interference, and is therefore difficult to estimate a switching element whose maximum temperature only at an electric angle.

Unlike a simple heat interference model taking an estimation temperature of each element as a reference, the present application uses a heat interference model which takes a loss as a reference. Therefore, a temperature increase value can be accurately estimated, for phases other than a phase including an element (recording a maximum temperature) as a temperature detection target.

Figure 5:
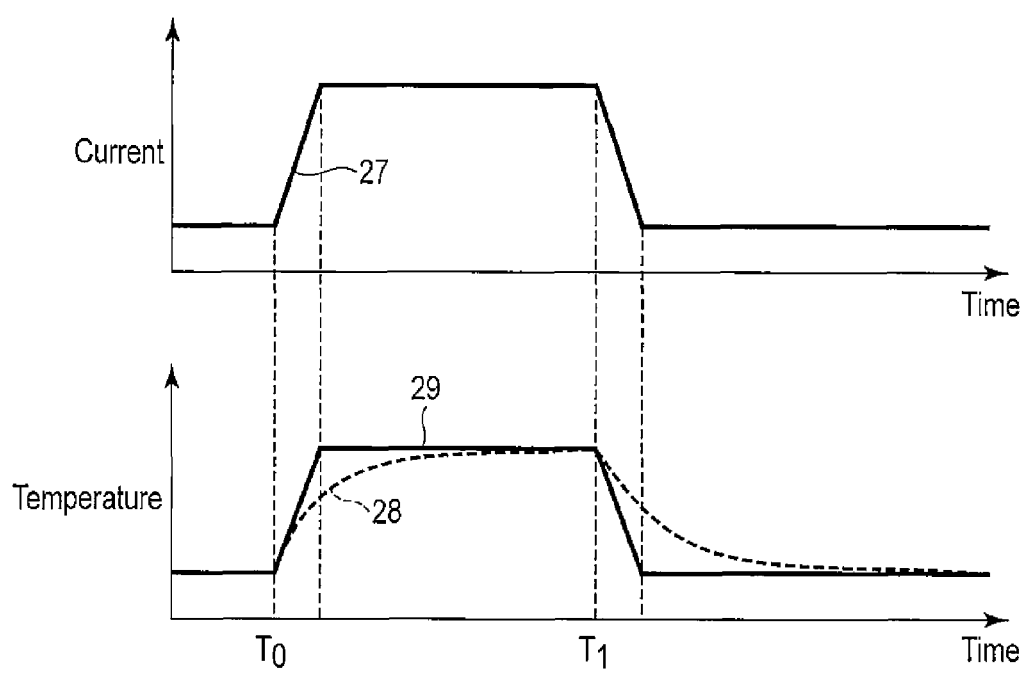
FIG. 5 is graphs representing chronological changes of a conduction current and a switching element temperature according to the embodiment 1.

Further, the prior art configures a conventional thermal transfer impedance by thermal resistance components only, and therefore, cannot follow a temperature change in a transition state. For example, a description will now be made based on FIG. 5. When a current 27 increases at a time point of time T0, an estimation temperature 29 abruptly increases, depending on a current in relation to a true temperature 28 which gently changes under the influence of actual thermal capacity. Therefore, the estimation temperature 29 is estimated to be higher than the true temperature 28. When the current decreases at time T1, the estimation temperature decreases to be lower than the true temperature, and reliability is impaired.

According to the present embodiment, junction temperatures of all the switching elements and return diodes can be accurately estimated, without depending on the configuration, operation mode, and transition state of the module. Therefore, steady protection can be achieved, and an inverter apparatus with high reliability can be provided.

Embodiment 2

Next, the second embodiment of an inverter according to the invention will be described. In the present embodiment, an improvement is made on a loss estimation method according to the embodiment 1. Therefore, the same configurations as those of the embodiment 1 will be denoted at the same reference signs, and reiterative descriptions will be omitted.

In the embodiment 1, $T_j$ used in loss calculations through Expressions 1 to 5 is substituted with a maximum temperature $T_{NMAX}$ of the low-side elements detected by a temperature sensor. In an operation using a control operation apparatus 10, a temperature calculation is repeatedly performed for each control cycle $T_{CTRL}$. Therefore, a temperature at present can be estimated by using an estimated temperature of each element obtained before the control cycle $T_{CTRL}$. A loss (a value close to an actual value) can be more accurately estimated by using estimated temperatures of respective switching elements and return diodes which comply with actual situations than by uniquely using the maximum temperature $T_{NMAX}$. The control cycle TCTRL needs to be sufficiently shorter than a heat/time constant to approximate a true temperature at the instance of estimation to an estimation temperature before the control cycle TCTRL used for estimation.

Embodiment 3

Next, the third embodiment of an inverter apparatus according to the invention will be described. The present embodiment is applied to a hybrid car of a sili-para system on which an inverter for driving an electric motor for driving and an inverter for a power generator driven by an engine are mounted. Since two inverters are mounted on the hybrid car of the sili-para system, the two inverters are integrated, in some cases, in order to reduce a mount space. At this time, semiconductor elements for the electric motor and semiconductor elements for the power generator are mounted on a module configured by semiconductor elements. Therefore, the semiconductor elements are influenced under heat generated from each other. The embodiments 1 and 2 relate to temperature estimation limited to an inverter for an electric motor. Under influence of heat generation from semiconductor elements for the power generator, as in the present embodiment, errors occur in temperature estimation.

FIG. 6 shows an example configuration of the present embodiment. The same configurations as those of the embodiment 1 will be denoted at the same reference signs, and reiterative descriptions will be omitted. The inverter which drives an electric motor 5 has exactly the same configuration as the embodiment 1. The inverter for the power generator comprises a condenser 101, switching elements $S_{GU}$, $S_{GV}$, $S_{GV}$, $S_{GX}$, $S_{GY}$, and $S_{GZ}$, and return diodes $D_{GU}$, $D_{GV}$, $D_{GW}$, $D_{GX}$, $D_{GY}$, and $D_{GZ}$. This inverter is connected to a power generator 103 driven by an engine 103, and returns electric power to a direct-current voltage source 4. A control operation apparatus 10 is added with a current controller 104 for a power generator. In accordance with a current instruction value I*105 which is instructed from a hybrid car, depending on a charge state of a battery (direct-current voltage source 4), the current controller generates a current value detected by a current sensor 106, and a gate signal 110 for switching elements, from an electric angle 109 detected by an angle sensor 108 of the power generator. The gate signal 110 is input to a gate drive circuit 111 to switch on/off a switching element. Like the inverter for the electric motor, temperature detection of the inverter for the power generator is to detect an element having a maximum temperature in a low side.

A temperature detection circuit 112 also has the same configuration as the temperature detection circuit 9 for the inverter for the electric motor. A temperature estimation unit 113 estimate's junction temperatures of all the semiconductor elements of both inverters for the electric motor and power generator. Therefore, a current value 107 for the power generator and a maximum temperature element temperature 114 in the low side are used by the temperature estimation unit 113. Hereinafter, an estimation method will be described. As shown in FIG. 7 in which a module 115 which integrates a U-phase of the inverter for the electric motor and a U-phase of the inverter for the power generator is an example, the number of semiconductor elements to be mounted is eight. A basic estimation method is the same as those in the embodiments 1 and 2 while only the number of elements as targets for temperature estimation increases. At first, losses of all elements are estimated by Expressions 1 to 5. However, as a detection current used for loss estimation, a current value 19 detected by a current sensor 18 is used for semiconductor elements in the side of the electric motor, and a current value 107 detected by a current sensor 106 is used for semiconductor elements in the side of the power generator. The thermal transfer impedance of Expression 8 is measured in advance. Expression 12 is used as an expression which expresses the relationship between a temperature increase and a loss in Expression 9.

$$\begin{bmatrix} \Delta T_{SU} \\ \Delta T_{SX} \\ \Delta T_{DU} \\ \Delta T_{DX} \\ \Delta T_{GSU} \\ \Delta T_{GSX} \\ \Delta T_{GDU} \\ \Delta T_{GDX} \end{bmatrix} = \begin{bmatrix} z_{11} & z_{21} & z_{31} & z_{41} & z_{51} & z_{61} & z_{71} & z_{81} \\ z_{12} & z_{22} & z_{32} & z_{42} & z_{52} & z_{62} & z_{72} & z_{82} \\ z_{13} & z_{23} & z_{33} & z_{43} & z_{53} & z_{63} & z_{73} & z_{83} \\ z_{14} & z_{24} & z_{34} & z_{44} & z_{54} & z_{64} & z_{74} & z_{84} \\ z_{15} & z_{25} & z_{35} & z_{45} & z_{55} & z_{65} & z_{75} & z_{85} \\ z_{16} & z_{26} & z_{36} & z_{46} & z_{56} & z_{66} & z_{76} & z_{86} \\ z_{17} & z_{27} & z_{37} & z_{47} & z_{57} & z_{67} & z_{77} & z_{87} \\ z_{18} & z_{28} & z_{38} & z_{48} & z_{58} & z_{68} & z_{78} & z_{88} \end{bmatrix} \begin{bmatrix} P_{SU} \\ P_{SX} \\ P_{DU} \\ P_{DX} \\ P_{GSU} \\ P_{GSX} \\ P_{GDU} \\ P_{GDX} \end{bmatrix} \quad (12)$$

Temperature increase values of the semiconductor elements mounted on the modules of the V- and W-phases can also be obtained by using the same expression.

After the temperature increase values are obtained, junction temperatures are calculated in accordance with Expression 11. In the embodiments 1 and 2, the maximum temperature $T_{NMAX}$ of low-side elements of an inverter for an electric motor is used as a reference. The present embodiment also takes $T_{NMAX}$ as a reference. However, low-side elements for the power generator are subjected to temperature detection. When a maximum temperature $T_{NGMAX}$ of the low-side elements is obtained, the semiconductor elements for the power generator are estimated by using Expression 11 with reference to the maximum temperature $T_{NGMAX}$. That is, losses ($P_{GSU}$–$P_{GDX}$) of the power generator of Expression 12 are obtained by using a maximum temperature in the loss Expressions 1 to 5. A temperature increase value ΔT is obtained from Expression 12, and the temperature increase value ΔT is substituted in Expression 11, to obtain a junction temperature. Thus, positions of a semiconductor element as a target for temperature estimation and an element which detects a temperature as a reference are set in a relationship to be close to each other. Then, the temperature estimation accuracy increases.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inverter apparatus comprising:
   a direct-current power supply;
   high-potential side switching elements and freewheel diodes and low-potential side switching elements and freewheel diodes which are connected to the direct-current power supply;
   a unit which converts a direct current voltage into a predetermined alternating current voltage of a predetermined current and a predetermined frequency, depending on switching on/off of the high-potential side and low-potential side switching elements;
   a temperature sensor provided near at least one of the low-potential side switching elements; and
   a temperature estimation unit,
   wherein the temperature estimation unit estimates temperatures of the high-potential side switching elements by subtracting a temperature increase estimation value of said at least one of the low-potential side switching elements for which the temperature sensor is provided from a detected temperature of said at least one of the low-potential side switching elements, and then adding to a result of the subtraction a temperature increase estimation value of one of the high-potential side switching elements for which the temperature sensor is not provided, based on a loss model of the high-potential side and low-potential side switching elements and freewheel diodes, and a thermal resistance model of a module which fixes the high-potential side and low-potential side switching elements and freewheel diodes.

2. The inverter apparatus of claim 1, wherein the temperature sensor is provided for each of the low-potential side switching elements, which forms part of the inverter apparatus, and includes a unit which selects and inputs a highest one among temperatures of the switching elements to the temperature estimation unit.

3. The inverter apparatus of claim 1, wherein the temperature estimation unit determines:
   the loss model of each of the switching elements as a sum of a conduction loss a and a switching loss,
   the conduction loss a from a polynomial expressed by a value of instantaneous current flowing through the switching element, a conductance rate thereof, and a temperature detected by the temperature sensor,
   the switching loss from a polynomial expressed by the value of instantaneous current flowing through the switching element, the direct current voltage, and the temperature detected by the temperature sensor,
   the loss model of each of the freewheel diodes as a sum of a conduction loss b and a recovery loss,
   the conduction loss b from a polynomial expressed by a value of instantaneous current flowing through the freewheel diode, a conductance rate thereof, and the temperature detected by the temperature sensor, and
   the recovery loss from a polynomial expressed by the value of instantaneous current value flowing through the freewheel diode, a current conductance rate thereof, the direct current voltage, and the temperature detected by the temperature sensor.

4. The inverter apparatus of claim 1, wherein when an output frequency of the inverter apparatus is not higher than a given frequency, the temperature estimation unit determines:
   the loss model of each of the switching elements as a sum of a conduction loss a and a switching loss,
   the conduction loss a from a polynomial expressed by a value of instantaneous current flowing through the switching element, a conductance rate thereof, and a temperature detected by the temperature sensor,
   the switching loss from a polynomial expressed by the value of instantaneous current flowing through the switching element, the direct current voltage, and the temperature detected by the temperature sensor,
   the loss model of each of the freewheel diodes as a sum of a conduction loss b and a recovery loss,
   the conduction loss b from a polynomial expressed by a value of instantaneous current flowing through the freewheel diode, a conductance rate thereof, and the temperature detected by the temperature sensor, and
   the recovery loss from a polynomial expressed by the value of instantaneous current flowing through the freewheel diode, a current conductance rate thereof, the direct current voltage, and the temperature detected by the temperature sensor, and
   wherein when the output frequency of the inverter apparatus exceeds the given frequency, the temperature estimation unit determines:
   the loss model of each of the switching elements as a sum of the conduction loss a and the switching loss,
   the conduction loss a from a polynomial expressed by an effective current value flowing through the switching elements and a temperature detected by the temperature sensor,
   the switching loss from a polynomial expressed by an effective current value flowing through the switching elements and freewheel diodes, the direct current voltage and the temperature detected by the temperature sensor,
   the loss model of each of the freewheel diodes as a sum of the conduction loss b and the recovery loss, the conduction loss b from a polynomial expressed by an effective current value flowing through the freewheel diode and the temperature of the at least one of the switching elements detected by the temperature sensor, and the recovery loss from a polynomial expressed by the effective current value flowing through the freewheel diode, the direct current voltage, and the temperature of the at least one of the switching elements detected by the temperature sensor.

5. The inverter apparatus of claim 1, wherein the temperature estimation unit determines the thermal resistance model to be caused by thermal resistance between all the switching elements and the freewheel diodes and a cooler, and by a heat interference caused between all the switching elements and the freewheel diodes, and expresses the thermal resistances and mutually caused heat interferences as thermal resistances and thermal capacities.

6. The inverter apparatus of claim 3, wherein the temperature detected by the temperature sensor, which is used in the polynomials for obtaining losses of the switching elements and freewheel diodes, is taken as temperature of a switching element and a freewheel diode estimated just before.

7. The inverter apparatus of one of claims 1 to 5, wherein:
the inverter apparatus comprises a module mounted on a hybrid car of a sili-para system, which integrates switching elements forming an inverter for driving an electric motor for driving, and switching elements forming an inverter for a power generator driven by an engine, and the estimation unit estimates losses caused by the switching elements and freewheel diode for the inverter for the power generator, and estimates a temperature increase value in consideration of mutual influences of losses caused by the inverter for the electric motor and the inverter for the power generator.

* * * * *